Apr. 24, 1923.
E. H. CARPENTER
WASHER
Original Filed July 22, 1921
1,452,492
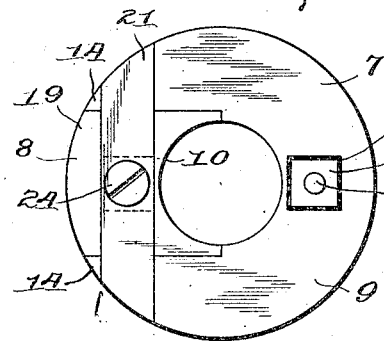
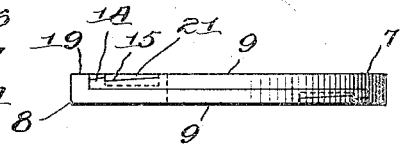
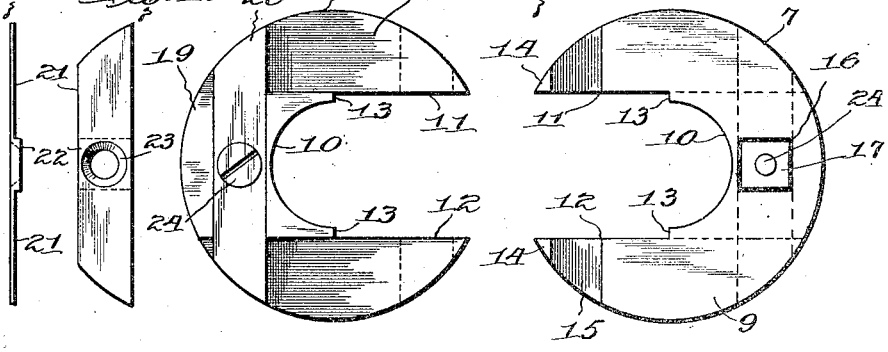
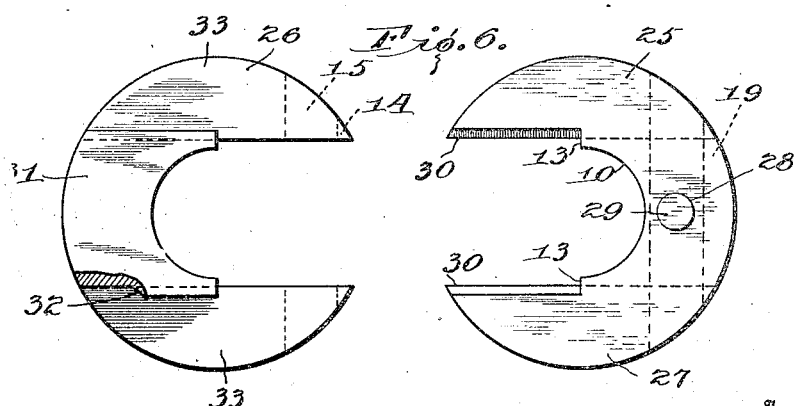
Inventor
E. H. Carpenter.
By Cordova Stuart
Attorneys.

Patented Apr. 24, 1923.

1,452,492

UNITED STATES PATENT OFFICE.

EDGAR H. CARPENTER, OF YOAKUM, TEXAS.

WASHER.

Application filed July 22, 1921, Serial No. 486,692. Renewed March 9, 1923.

*To all whom it may concern:*

Be it known that I, EDGAR H. CARPENTER, a citizen of the United States, residing in Yoakum, in the county of Lavaca and State of Texas, have invented certain new and useful Improvements in Washers, for which the following is a full and complete specification, reference being had to the accompanying drawings.

It is frequently found desirable to place a washer upon a bolt and beneath a nut already carried by the bolt. Circumstances frequently demand that such a washer be applied after the nut is on the bolt, where it would be a matter of considerable inconvenience to remove the nut for the purpose of applying the washer. It is an object of my invention to form a spacing member or washer in such a manner that it may be assembled on the shank of the bolt after the latter has received the nut. In this manner a plurality of washers may be consecutively applied as the need for increasing spacing members develops.

It is also an object of my invention to provide a washer formed of separable parts which are themselves interchangeable. My invention advantageously provides for the building up of the combined washer from identical members.

Once assembled, a washer made as hereinafter described is firmly held together and permits the customary tightening of the bolt. The washer is secured against the separation of its parts either radially or axially with respect to the axis of the bolt.

The above and other objects will be evident from the following description of my invention in a preferred form as illustrated in the accompanying drawings, in which—

Fig. 1 is a plan view of the assembled washer,

Fig. 2 is an elevation thereof,

Fig. 3 is a view of the two washer plates in separated position,

Fig. 4 is a plan view of the leaf spring,

Fig. 5 is a side view of the same, and

Fig. 6 is a plan view of a modification showing the plates separated.

In the form illustrated, my improved washer is constructed of suitable material such as wrought or malleable iron. The washer consists of two opposed circular plates 7 and 8.

Fig. 3 shows these plates 7 and 8 to be identical in form and generally U-shaped. The faces 9, Fig. 2, of the plates are planes. The plates are circular in form with an internal circular wall 10. The plates are cut away to form a wide radial slot extending from the inner diameter 10 to the periphery. The walls 11 and 12 of this slot are parallel, perpendicular to the face 9 of the plate and connected to the inner circumference 10 by means of the diametrical walls 13. The projecting tongues of each plate have their points 14 slightly tapered. A channel 15 is cut in the face 9 as indicated in Fig. 2, and for a purpose which will be later described. The face 9 is recessed as indicated at 16 in Fig. 3 to receive a squared nut 17.

The reverse face 18 of each plate is parallel to the surface 9. The portion of the plate between the walls 11 and 12 and opposite thereto is raised to form the land 19 as shown in Fig. 3, having parallel side walls forming guiding means for the opposing plate. A cross channel is cut in this land to receive a locking spring leaf 20.

The spring leaf 20 which is received in the cross channel of the land 19 is made of steel and consists of two wings 21 and the middle thickened portion 22. The portion 22 is counter-sunk as at 23 to receive a countersunk screw 24, the shank of which is threaded into the nut 17.

A modified form of my device is illustrated in Fig. 6 in which the two plates 25 and 26 are similar in general shape and proportions, the only difference between the two plates being in the manner of providing wedge or dove-tail fastening means in place of one locking leaf spring. The outer face of the plate 25 is a plane as shown at 27 being counter-sunk circularly at 28 to receive the head of a rivet 29. This rivet is placed in the plate on the diameter bisecting the slot formed by the inclined walls 30, 30, which latter diverge as they approach the surface 27. These side walls 30, 30, meet the diametrical walls 13, 13, which latter are connected by the internal circular wall 10. The reverse surface of the plate is formed with a land 19 cross channelled as shown in Figs. 1 and 3 to receive a leaf spring 21. The leaf spring is held in by means of the rivet 29.

The complementary plate 26 in this modification is formed with one obverse plane side while the reverse side shown in Fig. 6 has the land or raised portion 31. This raised portion terminates in inclined walls 32 which converge as they approach the face 33, 33 of the plate.

The obverse plane surface of the plate 26 has cross channels 15 and tapered points 14 to receive and hold the leaf spring 21, which is carried riveted to plate 25.

In the assembly of my device one plate is passed around the shank of the bolt with the circumferential wall 10 in contact with the bolt. A second plate identical with the first is then brought in contact with the first one from the opposite side of the bolt. The surfaces 18, 18 of the plates are brought together and the tapered points 14 on the obverse or outer surfaces 9, driven beneath the leaf spring 20 of the opposed member. As the leaf springs 20 ride over the points 14 they drop into the cross channels 15 with one edge held by the rear wall of the tapered points 14. In this manner each plate is located against radial movement away from the bolt by each spring. In like manner the leaf springs prevent relative movement between the plates longitudinal of the bolt and the composite washer is therefore firmly held together.

As assembled the washer forms a firm spacing member which is capable of operating in every manner customary to devices of this character.

In the modification shown in Fig. 6, the plate 25 is guided by the inclined side walls 30, 30 sliding along the converging side walls 32, 32. This forms a dove-tail joint which prevents separation of the plates longitudinal to the bolt. At the same time the leaf spring carried on plate 25 is locked in the cross channel 15 of plate 26 and behind the tapered points 14 of the latter. This prevents lateral separation of the plates 25 and 26.

While I have shown and described a preferred form of my improvement, it will be obvious that many changes may be made in proportion and minor details without departing from the spirit of my invention as defined in the appended claims.

What I claim is:

1. A washer including a plate having a raised portion, a resilient cross-bar mounted upon said raised portion and having a free end projecting beyond the raised portion, and a second plate receiving the free end of the cross-bar in locking engagement.

2. A washer including a plate having a raised portion, a resilient cross-bar mounted upon said raised portion and having a free end projecting in parallel spaced relation with the surface of the plate, a second plate slidable between the said cross-bar and the surface of the first plate, and means on the second plate for locking engagement with the cross-bar.

3. A washer consisting of two complementary U-shaped plates, guiding means on each plate, a resilient locking member, means for mounting the locking member within the plane surface of one plate, the second plate having tapered extremities and intermediate transverse channels to receive the locking member.

4. A washer consisting of two complementary plates, a raised portion on each plate, a resilient locking member carried in each raised portion, each plate being adapted to receive and hold the locking member of the complementary plate.

In testimony whereof, I have hereunto affixed my signature.

EDGAR H. CARPENTER.